June 25, 1957  M. WIENAND  2,796,797
METHOD OF PRODUCING ARMOURED SYNTHETIC PLASTIC TUBES
Filed Feb. 19, 1954
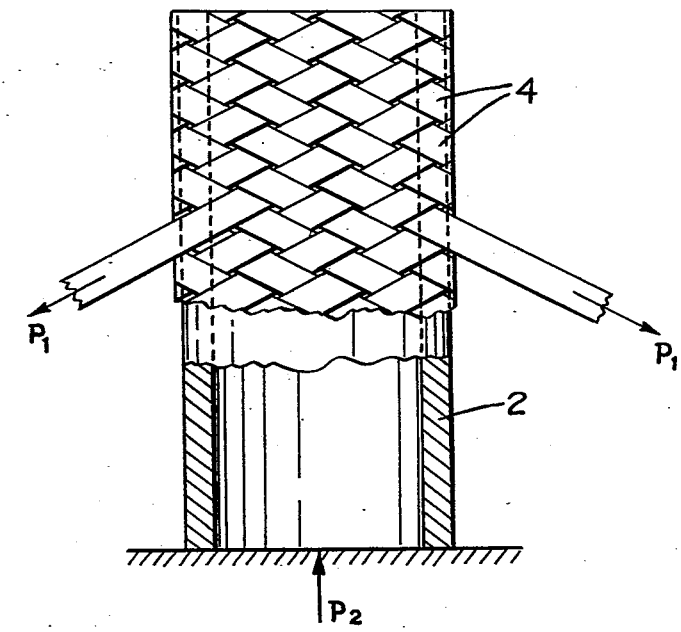
INVENTOR:
MICHAEL WIENAND
BY:

United States Patent Office 2,796,797
Patented June 25, 1957

2,796,797
METHOD OF PRODUCING ARMOURED SYNTHETIC PLASTIC TUBES

Michael Wienand, Siegburg, Germany, assignor to Dynamit Actien-Gesellschaft vormals Alfred Nobel & Co., Troisdorf, Germany Application February 19, 1954, Serial No. 411,348

Claims priority, application Germany February 21, 1953

4 Claims. (Cl. 87—9)

This invention relates to a method for the production of tubes, vessels, shaped pieces and the like hollow bodies from synthetic plastics, which are armoured with a jacket of a material of greater strength.

More particularly the invention relates to an improvement and development of a method for the production of shaped bodies of synthetic plastics which are armoured with a jacket of a material of greater strength, which comprises introducing said plastic shaped body into said jacket, and deforming both said plastic body and said jacket in such manner that the surfaces of said body are subjected in axial and tangential direction to such a degree of tangential and axial initial pressure stresses by said jacket that, at the lowest working temperature, for example about —20° C. in the case of hard polyvinyl chloride, and/or an internal positive pressure to which said body is to be subjected in use, a residual initial pressure stress is still present in each of said two directions. The production of the initial pressure stress is effected by mechanical deformation of the armour or of the synthetic plastic shaped piece, or of both, thus for example by drawing, stretching, upsetting, pressing, rolling or the like.

It is an object of the present invention to provide a novel method of applying the initial pressure stresses.

A particularly convenient method of producing the pressure stresses according to the present invention consists in braiding a synthetic plastic tube in a manner known per se with bands, wires, cords and the like, at such an angle to the longitudinal axis of the tube and with such initial stress that the direction of the braiding coincides with the resultant forces occurring on the stressing of the tube, for example by internal liquid pressure, and the sum of the forces produced by the braiding is equal to the axial initial pressure stress. The angle of the winding in relation to the longitudinal axis of the tube is obtained from the stress ratio in the axial and tangential directions, which amounts to about 0.5. This ratio corresponds to an angle of about 76°. The necessary initial stress with which the individual bands are treated by braiding can be calculated without difficulty by known methods.

In accordance with a further feature of the invention, the pre-stressing forces of the armoured synthetic plastic tube are produced by so adapting to one another the internal diameter of the armour tube and the external diameter of the synthetic plastic tube, vessel or shaped piece, taking into account the different coefficients of expansion of the two materials, that the, advantageously low-cooled, synthetic plastic part is accommodated with slight clearance in the metal armour, which if desired may be heated, and on the equalisation of the temperatures the different coefficients of expansion produce the desired initial pressure stressing in the shaped piece of synthetic plastic. This initial pressure stressing is thus produced by a shrinking operation.

The invention will now be described by way of example with reference to the accompanying drawing which illustrates a synthetic plastic tube 2 braided with cord 4 in accordance with the invention.

Here $P_1$ denotes the tensile forces in the direction of the cords and $P_2$ the initial stress in the axial direction. The angle between $P_1$ and $P_2$ is about 76°. Assuming an initial stress in the axial direction, resulting from the product of the cross-sectional area of the tube and the internal liquid pressure and represented by $P_2$, the sum of all $P_1$ forces and the force components falling in the axial direction would have to correspond to the force $P_2$.

I claim:

1. A method of making a hollow body capable of withstanding low temperatures, comprising the steps of placing an inner hollow liner of synthetic resilient plastic within an outer reinforcing jacket composed of braided, flexible, elongated members of a material stronger than said plastic; and tensioning said braided members to such an extent that said jacket exerts a compressive force on said liner sufficient to leave in the finished hollow body a residual liner stress tending to expand the same sufficiently to prevent said liner from contracting inwardly away from said jacket when the hollow body is cooled to a given temperature.

2. A method of making a hollow body capable of withstanding low temperatures, comprising the steps of placing an inner tubular liner of synthetic resilient plastic within an outer tubular reinforcing jacket composed of braided, flexible, elongated members of a material stronger than said plastic; and tensioning said braided members to such an extent that said jacket exerts an axial and tangential compressive force on said liner sufficient to leave in the finished hollow body a residual liner stress tending to expand the same sufficiently to prevent said liner from contracting inwardly away from said jacket when the hollow body is cooled to a given temperature.

3. A method of making a hollow body capable of withstanding low temperatures, comprising the steps of cooling an inner tubular liner of synthetic resilient plastic to a temperature below a given temperature so that said liner contracts to a size smaller than the size thereof at said given temperature; and placing the thus-cooled liner within an outer tubular jacket composed of elongated braided flexible members of a material stronger than said plastic and having an inner diameter substantially equal to that of the thus-cooled liner, so that when the latter warms to room temperature said braided members will be tensioned to exert a compressive force on said liner sufficient to leave in the finished hollow body a residual liner stress tending to expand the same sufficiently to prevent said liner from contracting inwardly away from said jacket when the hollow body is cooled to said given temperature.

4. A method of making a hollow body capable of withstanding low temperatures, comprising the steps of cooling an inner tubular liner of synthetic resilient plastic to a temperatures below a given temperature so that said liner contracts to a size thereof at said given temperature; heating an outer tubular jacket composed of elongated braided flexible members of a material stronger than said plastic to a temperature above room temperature and giving the jacket an inner diameter larger than the diameter thereof at room temperature and substantially equal to the outer diameter of the thus-cooled liner; and placing the thus-cooled liner within the thus-heated jacket, so that when said liner and jacket are at room temperature said braided members are tensioned to exert a compressive force on said liner sufficient to leave in the finished hollow body a residual liner stress tending to expand the same sufficiently to prevent said liner from contracting inwardly away from said jacket when the hollow body is cooled to said given temperature.

References Cited in the file of this patent

UNITED STATES PATENTS

| | | | |
|---|---|---|---|
| 2,111,639 | Petersen | Mar. 22, | 1938 |
| 2,211,478 | Pierce | Aug. 13, | 1940 |
| 2,233,205 | Frantz | Feb. 25, | 1941 |
| 2,286,136 | Johnson | June 9, | 1942 |